United States Patent
Itskovich et al.

(10) Patent No.: US 7,049,815 B2
(45) Date of Patent: May 23, 2006

(54) METHOD AND APPARATUS FOR MULTI-FREQUENCY NMR DIFFUSION MEASUREMENTS IN THE PRESENCE OF INTERNAL MAGNETIC FIELD GRADIENTS

(75) Inventors: Gregory Itskovich, Houston, TX (US); Arcady Reiderman, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 19 days.

(21) Appl. No.: 10/765,612

(22) Filed: Jan. 27, 2004

(65) Prior Publication Data

US 2005/0162162 A1    Jul. 28, 2005

(51) Int. Cl.
*G01V 3/00* (2006.01)
(52) U.S. Cl. ........................ 324/303; 324/306
(58) Field of Classification Search ........... 324/303, 324/306, 300, 307, 309, 312, 314
See application file for complete search history.

(56) References Cited

U.S. PATENT DOCUMENTS

| | | |
|---|---|---|
| 5,698,979 A | 12/1997 | Taicher et al. ............ 324/303 |
| 6,163,153 A | 12/2000 | Reiderman et al. ......... 324/314 |
| 6,348,792 B1 | 2/2002 | Beard et al. ............... 324/303 |
| 6,512,371 B1 | 1/2003 | Prammer ................... 324/303 |
| 6,522,136 B1 * | 2/2003 | Hurlimann et al. ......... 324/303 |
| 6,597,171 B1 | 7/2003 | Hurlimann et al. ......... 324/303 |
| 6,690,167 B1 | 2/2004 | Reiderman et al. ......... 324/314 |

* cited by examiner

*Primary Examiner*—Louis Arana
(74) *Attorney, Agent, or Firm*—Madan, Mossman & Sriram, P.C.

(57) ABSTRACT

Pulse sequences are applied to a fluid in an earth formation in a static magnetic field having internal gradients. From the received signals, relaxation and diffusion characteristics of the fluid are determined. The determination takes into account the internal field gradients.

41 Claims, 6 Drawing Sheets

METHOD AND APPARATUS FOR MULTI-FREQUENCY NMR DIFFUSION MEASUREMENTS IN THE PRESENCE OF INTERNAL MAGNETIC FIELD GRADIENTS

FIELD OF THE INVENTION

This invention relates to apparatus and techniques for making nuclear magnetic resonance (NMR) measurements in boreholes and to methods for determining magnetic characteristics of formations traversed by a borehole. Specifically, the invention relates to design an accurate NMR measurement technique, which is aimed at defining the diffusion properties of the fluid in the pore matrix in the presence of the internal magnetic field gradients.

BACKGROUND OF THE INVENTION

A variety of techniques have been used in determining the presence and in estimating quantities of hydrocarbons (oil and gas) in earth formations. These methods are designed to determine parameters of interest, including among other things, porosity, fluid content, and permeability of the rock formation surrounding the wellbore drilled for recovering hydrocarbons. Typically, the tools designed to provide the desired information are used to log the wellbore. Much of the logging is done after the wellbores have been drilled. More recently, wellbores have been logged while drilling of the wellbores, which is referred to as measurement-while-drilling ("MWD") or logging-while-drilling ("LWD"). Measurements have also been made when tripping a drillstring out of a wellbore: this is called measurement-while-tripping ("MWT").

One evolving technique uses nuclear magnetic resonance (NMR) logging tools and methods for determining, among other things porosity, hydrocarbon saturation and permeability of the rock formations. NMR logging tools excite the nuclei of the fluids in the geological formations in the vicinity of the wellbore so that certain parameters such as spin density, longitudinal relaxation time (generally referred to in the art as "$T_1$"), and transverse relaxation time (generally referred to as "$T_2$") of the geological formations can be estimated. From such measurements, formation parameters such as porosity, permeability and hydrocarbon saturation are determined, which provides valuable information about the make-up of the geological formations and the amount of extractable hydrocarbons.

A typical NMR tool generates a static magnetic field $B_0$ in the vicinity of the wellbore and an oscillating field $B_1$ in a direction perpendicular to $B_0$. This oscillating field is usually applied in the form of short-duration pulses. The purpose of the $B_0$ field is to polarize the magnetic moments of nuclei parallel to the static field and the purpose of the $B_1$ field is to rotate the magnetic moments by an angle controlled by the width $t_p$ and the amplitude $B_1$ of the oscillating pulse. For NMR logging, the most common sequence is the Carr-Purcell-Meiboom-Gill ("CPMG") sequence that can be expressed as $$TW-90-(\tau-180-\tau-echo)_n \qquad (1)$$

where TW is a wait time, 90 is a 90° tipping pulse, 180 and is a 180° refocusing pulse and $2\tau=TE$ is the interecho spacing.

After being tipped by 90°, the magnetic moment precesses around the static field at a particular frequency known as the Larmor frequency $\omega$, given by $\omega=\gamma B_0$, where $B_0$ is the field strength of the static magnetic field and $\gamma$ is the gyromagnetic ratio. At the same time, the magnetic moments return to the equilibrium direction (i.e., aligned with the static field) according to a decay time known as the "spin-lattice relaxation time" or $T_1$. Inhomogeneities of the $B_0$ field result in dephasing of the magnetic moments and to remedy this, a 180° pulse is included in the sequence to refocus the magnetic moments. This refocusing gives a sequence of n echo signals. These echo sequences are then processed to provide information about the relaxation times.

Also associated with the spin of molecular nuclei is a second relaxation time, $T_2$, called the transverse or spin—spin relaxation time. At the end of a 90° tipping pulse, all the spins are pointed in a common direction perpendicular, or transverse, to the static field, and they all precess at the Larmor frequency. However, because of small fluctuations in the static field induced by other spins or paramagnetic impurities, the spins precess at slightly different frequencies and the transverse magnetization dephases with a relaxation time $T_2$.

Interpretation of NMR core or log data is often started by inverting the time-domain CPMG echo decay into a $T_2$ parameter domain distribution. In general, the $T_2$ of fluids in porous rocks depends on the pore-size distribution and the type and number of fluids saturating the pore system. Because of the heterogeneous nature of porous media, $T_2$ decays exhibit a multiexponential behavior. The basic equation describing the transverse relaxation of magnetization in fluid saturated porous media is $$M(t) = \int_{T_{2\min}}^{T_{2\max}} P(T_2)e^{-t/T_2} dT_2 \qquad (2)$$

where M is magnetization and effects of diffusion in the presence of a magnetic field gradient have not been taken into consideration. Eq.(2) is based on the assumption that diffusion effects may be ignored. In a gradient magnetic field, diffusion causes atoms to move from their original positions to new ones which also causes these atoms to acquire different phase shifts compared to atoms that did not move. This contributes to a faster rate of relaxation.

The effect of field gradients is given by an equation of the form $$\frac{1}{T_2} = \frac{1}{T_{2bulk}} + \frac{1}{T_{2surface}} + \frac{1}{T_{2diffusion}} \qquad (3)$$

where the first two terms on the right hand side are related to bulk relaxation and surface relaxation while the third term is related to the field gradient G by an equation of the form $$T_{2diffusion} = \frac{C}{TE^2 \cdot G^2 \cdot D} \qquad (4)$$

where TE is the interecho spacing, C is a constant and D is the diffusivity of the fluid.

U.S. Pat. No. 6,512,371 to Prammer, et. al., discloses a well logging system and method for detecting the presence and estimating the quantity of gaseous and liquid hydrocarbons in the near-wellbore zone. The system uses a gradient-based, multiple-frequency NMR logging tool to extract signal components characteristic for each type of hydrocarbon. Measurements at different frequencies are interleaved to obtain, in a single logging pass, multiple data streams corresponding to different recovery times and/or diffusivity for the same spot in the formation.

One of the main difficulties in defining self-diffusion parameters of the fluid in the pore matrix is related to the fact that different fluids having the same relaxation times and different diffusion coefficients cannot be effectively separated. Due to the practical limitation of the signal-to-noise ratio, none of the existing inversion techniques allow an effective and stable reconstruction of both the relaxation and diffusion spectra.

Another difficulty in relaxation and diffusion spectra reconstruction is caused by internal magnetic gradients. Typically, the values of the internal gradients are unknown. Thus, the diffusion parameters cannot be correctly defined if the internal gradients are not considered in both the measurement and interpretation scheme.

To separate the relaxation and diffusion process, U.S. Pat. No. 6,597,171 to Hurlimann, et al. introduced the so-called diffusion editing sequence allowing an effective separation of the relaxation and diffusion process. The diffusion editing sequence is a short pulse sequence allowing different sensitivities of the measured NMR signal to the self-diffusion coefficients. Several different types of diffusion editing sequences are described in Hurlimann, '171, including an inversion recovery sequence and a driven equilibrium sequence. After the diffusion editing sequence a regular CPMG sequence with a short TE is applied to acquire NMR data. As demonstrated by Hurlimann '171 the diffusion editing technique allows for a 2D map with a relaxation time $T_2$, in one direction and diffusion coefficient in a second direction. However, this technique fails to define the diffusion coefficient if internal magnetic field gradients are present in the formation.

The internal gradient issue, in relation to the diffusion measurements, was discussed in U.S. Pat. No. 5,698,979 to Taicher, et al., having the same assignee as the present application and the contents of which are incorporated herein by reference. Taicher suggested the use of dual frequency measurements when two different values of a static magnetic field within the porous medium are used to find decay rates for each frequency. It showed that under the assumption that internal gradients, $G_i$, are proportional to a static magnetic field and the difference in the magnetic susceptibility between the fluid and the solid matrix, the diffusion coefficients could be uniquely defined. The Taicher approach does not address differentiating fluids with the same relaxation times and different diffusion coefficients (in other words, generating a 2D map with a relaxation time, $T_2$, in one direction and a diffusion coefficient in a second direction).

There is a need for a system and method of determining diffusion coefficients and relaxation times of fluids in an earth formation that takes into account internal field inhomogeneities. Such a system and method should preferably be efficient in terms of power consumption and acquisition time. The present invention satisfies this need and provides several advantages that would be recognized by those versed in the art.

SUMMARY OF THE INVENTION

The present invention is a method and apparatus for determining a parameter of interest of an earth formation using a Nuclear Magnetic Resonance (NMR) tool conveyed in a borehole in the earth formation. A magnet on the NMR tool applies a static magnetic field to the earth formation and aligns nuclear spins. The effective magnetic field gradient is different from the applied static magnetic field due to the presence of an internal field gradient. A series of radio frequency (RF) diffusion editing magnetic pulse sequence are applied. In a diffusion editing sequence, a latter portion of the pulse sequence refocuses a final echo produced by the earlier portion of the pulse sequence. The diffusion editing sequence is applied at one or more different frequencies. From the ensemble of received signals, the $T_2$ spectral distribution and the diffusion coefficients are determined. These determinations make it possible to determine parameters of interest of the earth formation such as total porosity, clay bound water, bound volume irreducible, gas saturation and oil saturation may be determined.

The earlier portion of a diffusion editing pulse sequence could be a CPMG sequence, a modified CPMG sequence (i.e., tipping angle of refocusing pulse less than 180°), an inversion recovery sequence or a driven equilibrium sequence. For the case where the earlier portion includes a CPMG or a modified CPMG sequence, the refocusing-pulse spacing is larger than refocusing pulse spacing for the latter portion of a diffusion editing sequence. The latter portion of a diffusion editing sequence could be a CPMG sequence or a modified CPMG sequence having a refocusing pulse with a tipping angle of less than 180°. The interval between refocusing pulses should be as small as possible.

The number of diffusion editing pulse sequences is selected to be at least equal to the number of desired components of the resolved $T_2$ spectrum. The number of frequencies at which measurements are made is equal to or greater than the number of diffusion components. In the latter case, an overdetermined system of equations is solved.

The NMR tool may be conveyed into the borehole on a wireline, coiled tubing, or a drillstring.

BRIEF DESCRIPTION OF THE DRAWINGS

The present invention is best understood with reference to the following figures in which like numerals refer to like elements, and in which.

DETAILED DESCRIPTION OF THE EMBODIMENT

Figure 1:
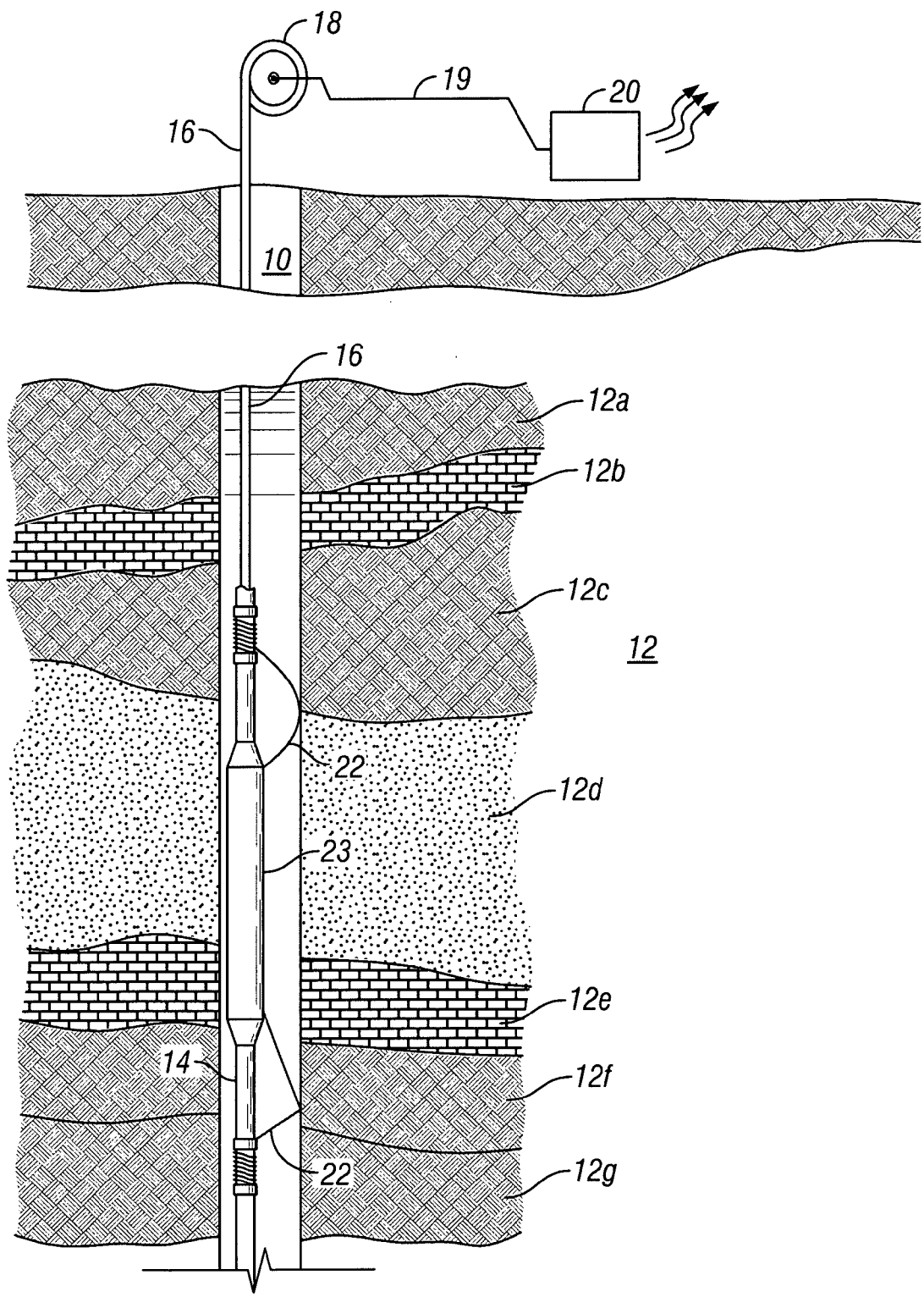
FIG. 1 depicts diagrammatically an NMR logging tool in a borehole.

FIG. 1 depicts a borehole 10 drilled in a typical fashion into a subsurface geological formation 12 to be investigated for potential hydrocarbon producing reservoirs. An NMR logging tool 14 has been lowered into the hole 10 by means of a cable 16 and appropriate surface equipment (represented diagrammatically by a reel 18) and is being raised through the formation 12 comprising a plurality of layers 12a through 12g of differing composition, to log one or more of the formation's characteristics. The NMR logging tool may be provided with bowsprings 22 to maintain the tool in an eccentric position within the borehole with one side of the tool in proximity to the borehole wall. The permanent magnets 23 provide the static magnetic field. Signals generated by the tool 14 are passed to the surface through the cable 16 and from the cable 16 through another line 19 to appropriate surface equipment 20 for processing, recording, display and/or for transmission to another site for processing, recording and/or display. Alternatively, the processor may be located at a suitable position (not shown) downhole, e.g., in the logging tool 14.

Figure 2:
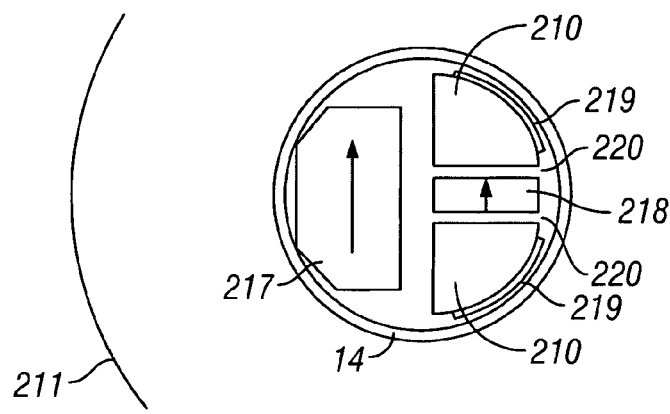
FIG. 2 shows an exemplary configuration of magnets, antenna and shield suitable for use with the present invention.

FIG. 2 (prior art) schematically illustrates an exemplary embodiment of an apparatus suitable for use with the method of the present invention. This is discussed in detail in U.S. Pat. No. 6,348,792 of Beard et. al., having the same assignee as the present invention; the contents of which are fully incorporated herein by reference. The tool cross-sectional view in FIG. 2 illustrates a main magnet 217, a second magnet 218 and a transceiver antenna comprising wires 219 and core material 210. The arrows 221 and 223 depict the polarization (e.g., from the South pole to the North pole) of the main magnet 217 and the secondary magnet 218. A noteworthy feature of the arrangement shown in FIG. 2 is that the polarization of the magnets providing the static field is towards the side of the tool, rather than towards the front of the tool (the right side of FIG. 2).

The second magnet 218 is positioned to augment the shape of the static magnetic field by adding a second magnetic dipole in close proximity to the RF dipole defined by the wires 219 and the soft magnetic core 210. This positioning moves the center of the effective static dipole closer to the RF dipole, thereby increasing the azimuthal extent of the region of examination. The second magnet 218 also reduces the shunting effect of the high permeability magnetic core 210 on the main magnet 217. In the absence of the second magnet, the DC field would be effectively shorted by the core 210. Thus, the second magnet, besides acting as a shaping magnet for shaping the static field to the front of the tool (the side of the main magnet) also acts as a bucking magnet with respect to the static field in the core 210. Those versed in the art will recognize that the bucking function and a limited shaping could be accomplished simply by having a gap in the core; however, since some kind of field shaping is required on the front side of the tool, in a preferred embodiment of the invention, the second magnet serves both for field shaping and for bucking. If the static field in the core 210 is close to zero, then the magnetostrictive ringing from the core is substantially eliminated.

Within the region of investigation, the static field gradient is substantially uniform and the static field strength lies within predetermined limits to give a substantially uniform Larmor frequency. Those versed in the art will recognize that the combination of field shaping and bucking could be accomplished by other magnet configurations than those shown in FIG. 2.

Still referring to FIG. 3, the transceiver wires 219 and core pieces 210 may be separated as far as possible towards the sides of the tool. This separation increases the transceiver antenna efficiency by increasing the effective RF dipole of the antenna and augments the shape of the RF magnetic field isolines so that they better conform to the static magnetic field isolines. The secondary magnet may be made of nonconducting material to minimize eddy currents induced by the RF field, thereby increasing the RF antenna efficiency.

The antenna core may be made of a powdered soft magnetic material, other than ferrite, as disclosed in U.S. Pat. No. 6,452,388 of Reiderman et. al. having the same assignee as the present invention and the contents of which are fully incorporated herein by reference. The antenna core has a high saturation flux density and comprises particles of powdered material small enough to be transparent to the RF magnetic field.

For the purposes of the method of the present invention, the formation is characterized by a model having a multi-exponential spectrum of the form:

$$T_2^{(1)}, T_2^{(2)}, T_2^{(3)}, T_2^{(i)}, T_2^{(M)} \quad (5)$$

Associated with each $T_2^{(i)}$, there are several diffusion coefficient values. These are denoted by $$D_i^{(1)}, D_i^{(2)}, D_i^{(N)} \quad (6)$$

The corresponding amplitudes are denoted by:

$$A_{i0}^{(1)}, A_{i0}^{(2)}, A_{i0}^{(N)} \quad (7)$$

Without loss of generality, it can be assumed that the same number of terms N for each i-term of the $T_2$ distribution is used to represent the diffusion distribution function. The present invention establishes a set of measurements, and an adequate processing technique, for determining both transversal time and diffusion distribution function in the presence of internal field gradients $G_I$ and an external magnetic field gradient G.

The internal gradients, $G_I$, are proportional to the magnitude of the applied magnetic field, $H_0$, and the difference in the magnetic susceptibility, $\Delta_\chi$, between the fluid and the solid matrix $$G_I = H_0 \Delta_\chi / 4R_\rho = \alpha H_0 \quad (8)$$

where $R_\rho$—is the effective radius of the pore matrix and $\alpha = \Delta_\chi / 4R_\rho$. The effective gradient, $G_e$, can be is estimated as:

$$G_e = \sqrt{G^2 + G_I^2} \quad (9)$$

Each exponential term decays according to the following expression:

$$A_i^j(t) = A_{i0}^{(j)} \cdot \exp(-t/T_2^{i*}) \quad (10)$$

where $A_{i0}$ corresponds to the total number of protons having a transversal relaxation time, $T_i$, and $T_2^{i*}$ represents an effective relaxation decay comprised of two different components—decay due to transversal relaxation $T_2$ and decay due to diffusion process:

$$\frac{1}{T_2^{i*}} = \frac{1}{T_2^i} + \frac{1}{12} \gamma^2 \cdot G_e^2 \cdot D \cdot TE^2 \quad (11)$$

where γ—the gyromagnetic ratio, $G_e$—an effective magnetic field gradient, TE is the echo spacing, Eqns. (10) and (11), shows that the signal decay due to diffusion, D, increases with time. In a manner similar to that discussed by Hurlimann '171, one can apply a diffusion editing sequence to separate the diffusion and relaxation process. Applying the standard CPMG sequence with a small echo spacing TE, the diffusion will not have an impact on the train and the $T_2$ spectrum can be reconstructed. Applying a second sequence with an increased value $TE_{long}$ for the first two echo-spacings, and then following it by a series of 180° B-pulses with a small TE (a diffusion editing sequence), the decay rate of the two trains after time $t_d=2TE_{long}$ will be the same. The initial amplitude of the second echo train is smaller compared to the amplitude of the first echo train measured from the standard CPMG.

If the diffusion is described as the diffusion distribution function, the signal drop for each $T_2^i$ term is defined by the series of exponential terms. The series has as many exponents N as the number of diffusion coefficients in the representation of the diffusion distribution function. In the case of the diffusion editing sequence, the signal decay of the train amplitude for large times, $t_d$, is defined by the expression:

$$A(t) = \sum_{i=1}^{M} \left[ A_{i0}^{(1)} \exp\left(-\frac{1}{6}\gamma^2 G_e^2 D_i^{(1)} TE_{long}^3\right) + A_{i0}^{(2)} \exp\left(-\frac{1}{6}\gamma^2 \cdot G_e^2 D_i^{(2)} TE_{long}^3\right) + \ldots A_{i0}^{(N)} \exp\left(-\frac{1}{6}\gamma^2 G_e^2 D_i^{(N)} TE_{long}^3\right) \right] \exp\left(-\frac{t}{T_2^i}\right) \quad (12)$$

When there is no internal magnetic field gradient and $G_e$ represents an external gradient only, the technique described in Hurlimann '171 will provide a sufficient set of data for diffusion distribution reconstruction. To reconstruct the N terms of the diffusion distribution function, at least N different measurements with different diffusion editing times, $TE_{long}$ are required. However, in practice, the condition of zero internal magnetic field gradient is not usually satisfied. Internal magnetic gradients are present in the formation and do affect the measurements. For this reason the approach described in Hurlimann '171 will not be sufficient to determining the diffusion distribution coefficients, $D_i^{(j)}$. What can be determined is the product of the coefficient and the effective magnetic gradient. The effective magnetic field gradient is unknown, hence the diffusion coefficients cannot be determined.

The present invention reconstructs the diffusion distribution in the presence of the internal magnetic gradients by using additional measurements carried out in different gradient fields. For any given value $TE_{long}$ of the diffusion editing sequence, the expression in the square brackets of eqn. (12) can be considered as an amplitude corresponding to the relaxation term $T_2^{(i)}$ of the multi-exponential spectrum. This may be defined as an equivalent amplitude spectrum. This equivalent spectrum can be reconstructed from the data corresponding to each diffusion editing sequence by prior art methods. An example of such a reconstruction using singular value decomposition is given in U.S. Pat. No. 5,517,115 to Prammer. Other methods also exist for performing a spectral decomposition, any of which could be used.

In the present invention, a series of K diffusion editing sequences is applied where $K \geq N$. The K distributions of $T_2$ can be reconstructed by inversion. For each i-term of $T_2$, we have a series of reconstructed amplitudes, $S_i^j$. The following system of equations describes the relation between the amplitudes, $S_i^j$, and diffusion distribution, $D_i^{(j)}$:

$$\begin{cases} A_{i0}^{(1)} \cdot \exp(-1/6\gamma^2 G_e^2 D_i^{(1)} TE_{long(1)}^3) + \ldots A_{i0}^{(N)} \cdot \exp(-1/6\gamma^2 G_e^2 D_i^{(N)} TE_{long(1)}^3) = S_i^{(1)} \\ A_{i0}^{(1)} \cdot \exp(-1/6\gamma^2 G_e^2 D_i^{(1)} TE_{long(2)}^3) + \ldots A_{i0}^{(N)} \cdot \exp(-1/6\gamma^2 G_e^2 D_i^{(N)} TE_{long(2)}^3) = S_i^{(2)} \\ \overline{A_{i0}^{(1)} \cdot \exp(-1/6\gamma^2 G_e^2 D_i^{(1)} TE_{long(K)}^3) + \ldots A_{i0}^{(N)} \cdot \exp(-1/6\gamma^2 G_e^2 D_i^{(N)} TE_{long(3)}^3) = S_i^{(3)}} \end{cases} \quad (13)$$

Eqn. (13) can be written in terms of a generalized parameter Z in the form:

$$\begin{cases} A_{i0}^{(1)} \cdot \exp(-z_1/Z_i^{(1)}) + \ldots A_{i0}^{(N)} \cdot \exp(-z_1/Z_i^{(N)}) = S_i^{(1)} \\ A_{i0}^{(1)} \cdot \exp(-z_2/Z_i^{(1)}) + \ldots A_{i0}^{(N)} \cdot \exp(-z_2/Z_i^{(N)}) = S_i^{(2)} \\ \overline{A_{i0}^{(1)} \cdot \exp(-z_K/Z_i^{(1)}) + \ldots A_{i0}^{(N)} \cdot \exp(-z_K/Z_i^{(N)}) = S_i^{(K)}} \end{cases} \quad (14)$$

where $z_j = TE_{long(j)}^3$ and $$Z_i^{(j)} = \frac{6}{\gamma^2 G_e^2 D_i^j} \quad (15)$$

Eqn. (14) contains a set of exponential functions designed to cover all of the possible $Z_{(i)}$ values for which the individual amplitudes, $A_{i0}^{(j)}$, must be determined. In practice, the right hand side of the eqn. (14) is not defined exactly but with some error that depends on the level of the noise in the measurements and the accuracy in the reconstruction of the $T_2$ distribution. For this reason eqn. (14) should be treated in the sense of a least square problem with the number of the diffusion editing sequences, K, larger than the number of amplitudes, $A_{i0}^{(N)}$.

After solving eqn. (14) and using eqn. (15) (i.e., by inversion), the generalized parameter $Z_{(i)}^{(j)}$ and the product $P_i^{(j)} = G_e^2 D_i^{(j)}$ for each diffusion term can be estimated. To define the diffusion coefficient, $D_i^{(j)}$ at least one more measurement conducted at a different gradient is needed. This additional measurement is done in a magnetic field, $H_2$, having the gradient, $G_2$, different from the first magnetic field, $H_1$, having the gradient, $G_1$. This condition gives the following system of equations:

$$\begin{cases} P_{1,i}^{(j)} = G_{e1}^2 D_i^{(j)} = (G_1^2 + \alpha H_1^2) \cdot D_i^{(j)} \\ P_{2,i}^{(j)} = G_{e2}^2 D_i^{(j)} = (G_2^2 + \alpha H_2^2) \cdot D_i^{(j)} \end{cases} \quad (16)$$

From eqn. (16) the parameter, $\alpha$, and coefficient, $D_i^{(j)}$, for each term of the diffusion distribution can be determined:

$$\alpha = \frac{G_2^2 P_{1,i}^{(j)} - G_1^2 P_{2,i}^{(j)}}{P_{2,i}^{(j)} H_1^2 - P_{1,i}^{(j)} H_2^2} \quad (17)$$

and

-continued $$D_i^{(j)} = \frac{P_{1,i}^{(j)}}{G_1^2 + \alpha H_1^2} \quad (18)$$

To increase the accuracy in the diffusion distribution reconstruction, one embodiment of the invention uses multi-gradient measurements at several different, L, gradients. Then instead of eqn. (16), the following system of equations applies:

$$\begin{cases} P_{1,i}^{(j)} = G_{e1}^2 D_i^{(j)} = (G_1^2 + \alpha H_1^2) \cdot D_i^{(j)} \\ P_{2,i}^{(j)} = G_{e2}^2 D_i^{(j)} = (G_2^2 + \alpha H_2^2) \cdot D_i^{(j)} \\ \vdots \quad \vdots \quad \vdots \\ P_{1,i}^{(j)} = G_{el}^2 D_i^{(j)} = (G_l^2 + \alpha H_l^2) \cdot D_i^{(j)} \end{cases} \quad (19)$$

Eqn. (19) should be treated as a least squares problem with the number of equations, L, not less than 2. By solving eqn. (19) the diffusion coefficients $D_i^j$ comprising the diffusion distribution functions, will be defined for each $T_2^{(i)}$ term of the $T_2$ distribution. When L>2, the system of equations is overdetermined. It should be noted that different gradients can be obtained easily using the gradient tool described above with reference to FIG. 2. When a tool such as that in FIG. 2 is used, the two different gradients would correspond to two different frequencies and two different regions of examination. However, it is possible to get two different gradients at the same frequency using a suitable magnet configuration and a gradient coil on the NMR tool. In the latter case, the measurements could be made in either the same or in different regions of examination.

Figure 3A:
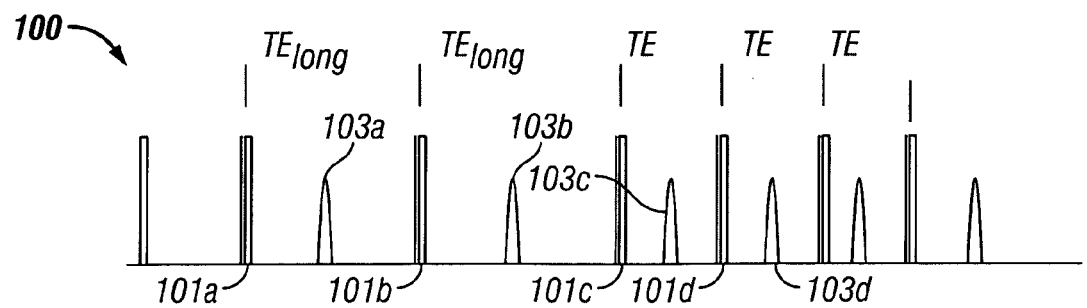
FIGS. 3*a* and 3*b* show simulated echo trains using a pulse sequence of the present invention for two different B pulse rotation angles.

Reconstruction of both $T_2$ and the diffusion distribution requires a vast number of measurements. In one embodiment of the invention, power requirements are optimized using the methodology described in U.S. Pat. No. 6,163,153 of Reiderman et. al. As described in the Reiderman '153 patent, NMR measurements in a gradient field with a reduced flip angle permit a better signal-to-noise ratio while consuming less DC power. The suggested pulse sequence in Reiderman '153 represents a CPMG sequence with the B-pulse rotation angle in the range of 90°–135°. In the case of multi-gradient and multi-$TE_{long}$ measurements, the application of a reduced flip angle, if possible, could save a great deal of DC power while boosting the signal-to-noise ratio. Based on this, in one embodiment of the invention, the following pulse sequence is used:

$$W-90_{\pm x}-TE_{long}/2-\beta_{Y1}-TE_{long}/2-\text{echo}_1-TE_{long}/2- \\ \beta_{Y1}-TE_{long}/2-\text{echo}_2-(TE/2-\beta_{Y2}-TE/2-\text{echo})_j \quad (20)$$

where j is the echo number in the train, W is the wait time, $TE_{long}$ is the diffusion editing spacing, TE is the Carr-Purcell spacing, $90_x$ and $\beta_{Y1}$ (or $\beta_{Y2}$) are the RF pulses providing rotation angles of 90 and $\beta_1$ (or $\beta_2$) degrees of the magnetization vector about the X and Y axis, respectively. The rotation angle, $\beta_1$, is set to be less than 180° or equal to 180°. The rotation angle, $\beta_2$, is set by adjusting the RF pulse duration and amplitude to compromise between peak power and excitation volume thickness. As discussed in Reiderman '153, the rotation angle $\beta_2$ is typically in the range of 90°–135°. The latter part of the pulse sequence (the term within parantheses) refocuses the last echo produced by the early part of the pulse sequence. The early (and the latter) part of the sequence given by eqn. (20) are modified CPMG sequence with a refocusing angle less than 180°. This pulse sequence is schematically illustrated in FIG. 3a. The 90° pulse is denoted by 100. The refocusing pulses are denoted by 101a, 101b, 101c, 101d . . . while the echos are denoted by 103a, 103b, 103c, 103d . . .

Figure 3B:
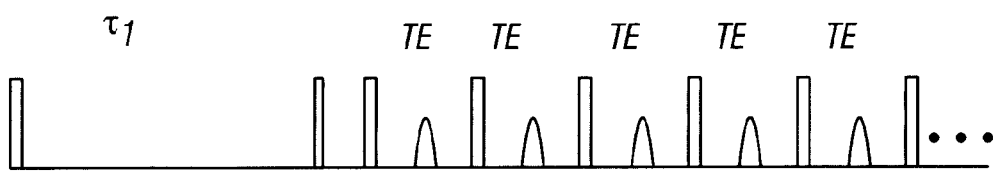
Figure 4A:
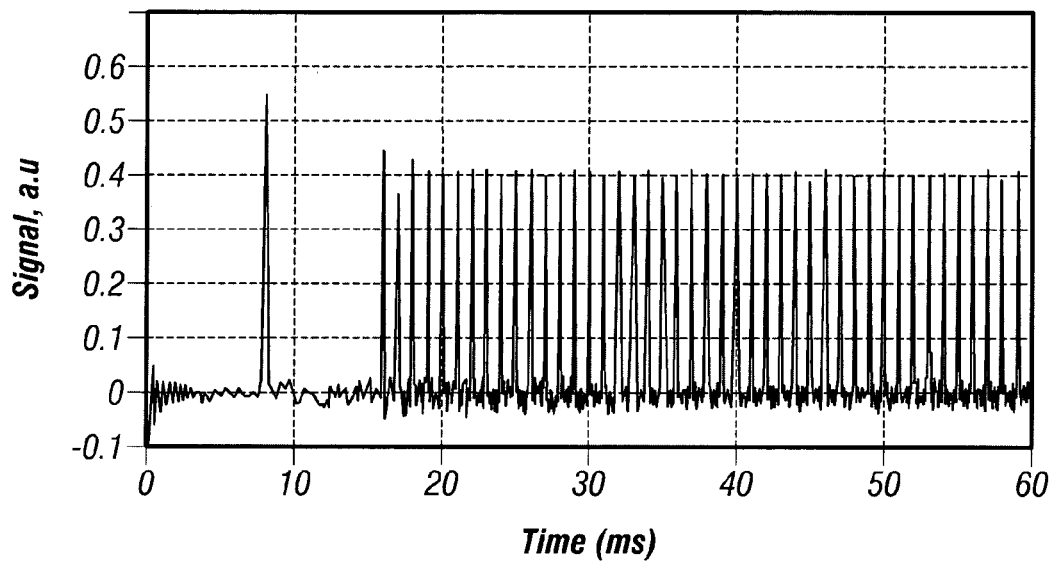
FIGS. 4*a* and 4*b* show the result of applying the diffusion editing pulse sequence with flip angles of 180° and 135°.
Figure 4B:
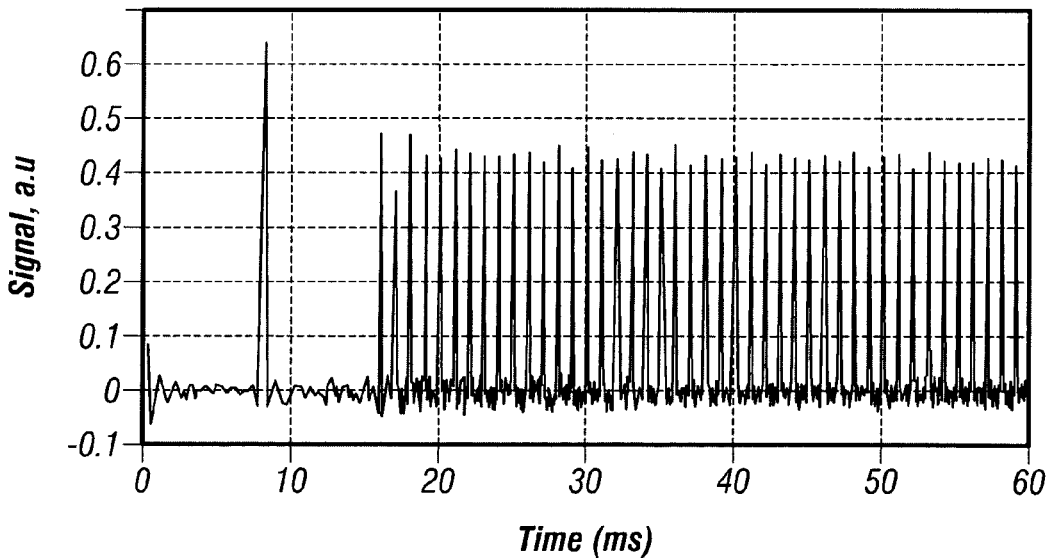

FIG. 4b shows that by applying the new diffusion editing sequence (20) with a flip angle, $\beta_Y=135°$ a stable echo train with a larger signal amplitude is received while consuming less DC power. (The amplitude of the train is increased due to the increase in the sensitive volume). For the example shown in FIG. 3b, $TE_{long}=8$ ms, TE=1 ms, and $T_1=T_2=\infty$. The deviation of the echo train from an echo train with a 180° flip angle can be easily corrected by using a set of pre-calculated correction coefficients. To calculate the correction coefficients, FIG. 4a shows a simulated echo train signal for the diffusion editing sequence eqn. (20) with a rotation angle $\beta_Y=180°$. The ration of the corresponding amplitudes from FIG. 4a and FIG. 4b gives the correction coefficients for the reduced flip angle.

Reiderman '153 shows the derivation of the correction coefficients for $T_1=T_2$. In co-pending U.S. patent application Ser. No. 09/976,493 of Reiderman et al., now U.S. Pat. No. 6,690,167, it is shown that such correction factors can be derived for values of $T_1 \neq T_2$.

In an alternate embodiment of the invention, instead of the modified CPMG pulse sequence given by eqn. (20), an inversion recovery sequence is used for the first part of the pulse sequence. This may be represented by:

$$180-\tau_1-90_{\pm x}-[TE/2-\beta_Y-TE/2-\text{echo}]_j \quad (21).$$

where 180 is a 180° inversion pulse, $\tau_1$ is a wait time, TE is an interecho time and $\beta_Y$ is a refocusing pulse with a tipping angle of Y. This pulse sequence is depicted in FIG. 3b. The initial 180° inversion pulse is shown by 110 and the rest of the sequence follows. In yet another embodiment of the invention, the first part of the pulse sequence is a driven equilibrium sequence as follows:

$$W-90_{\pm x}-[\delta_j-90_{\pm x}-(\Delta-\delta_j)-\text{echo}_{k,j}]-(TE/2-\beta_Y-TE/2- \\ \text{echo})_l \quad (21a)$$

Figure 3C:

This is depicted in FIG. 3c. The initially 90° tipping pulse is denoted by 120 and the rest of the sequence follows.

Figure 5A:
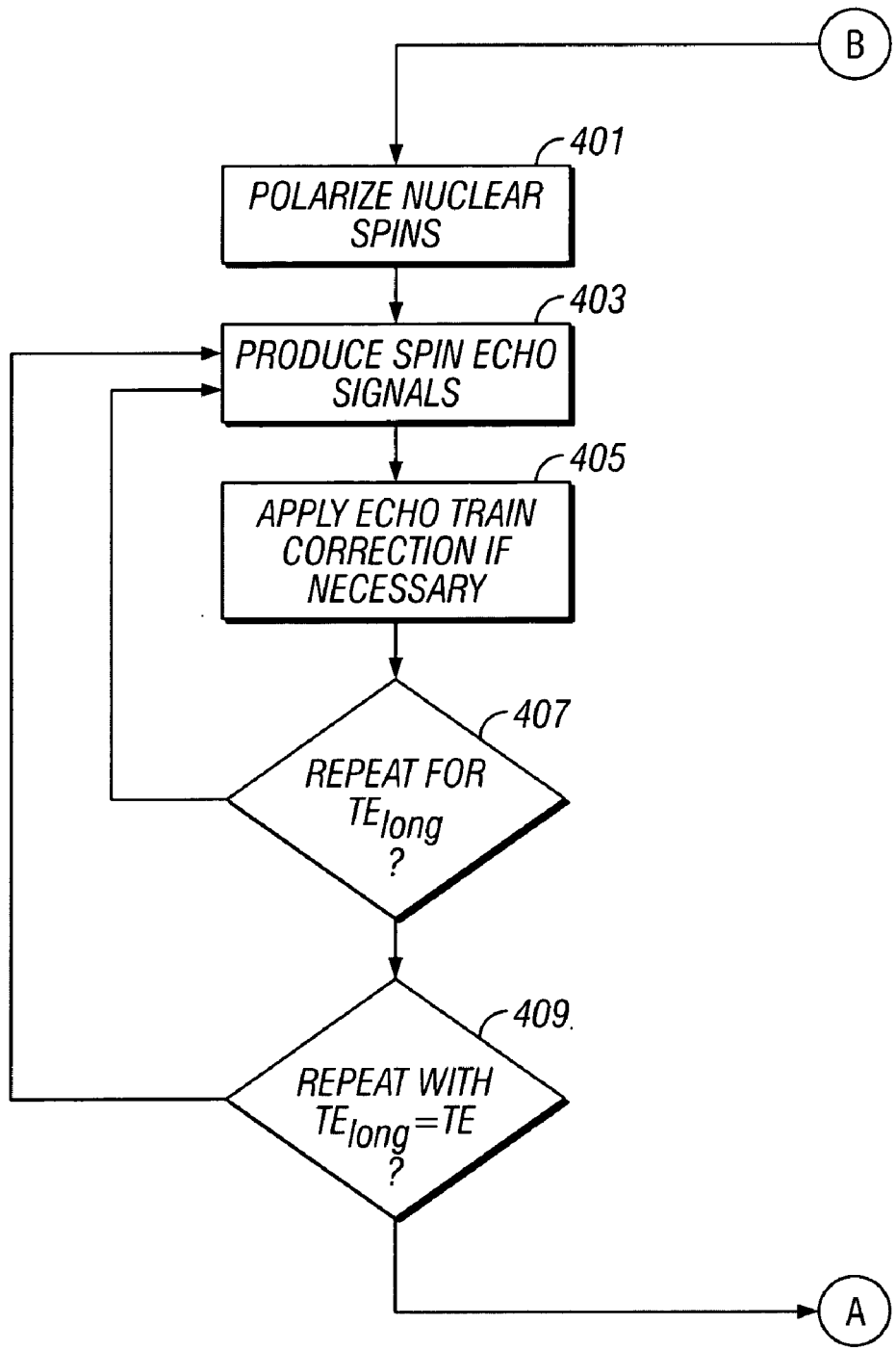
FIGS. 5*a* and 5*b* schematically illustrate operations in the method of the present invention.
Figure 5B:
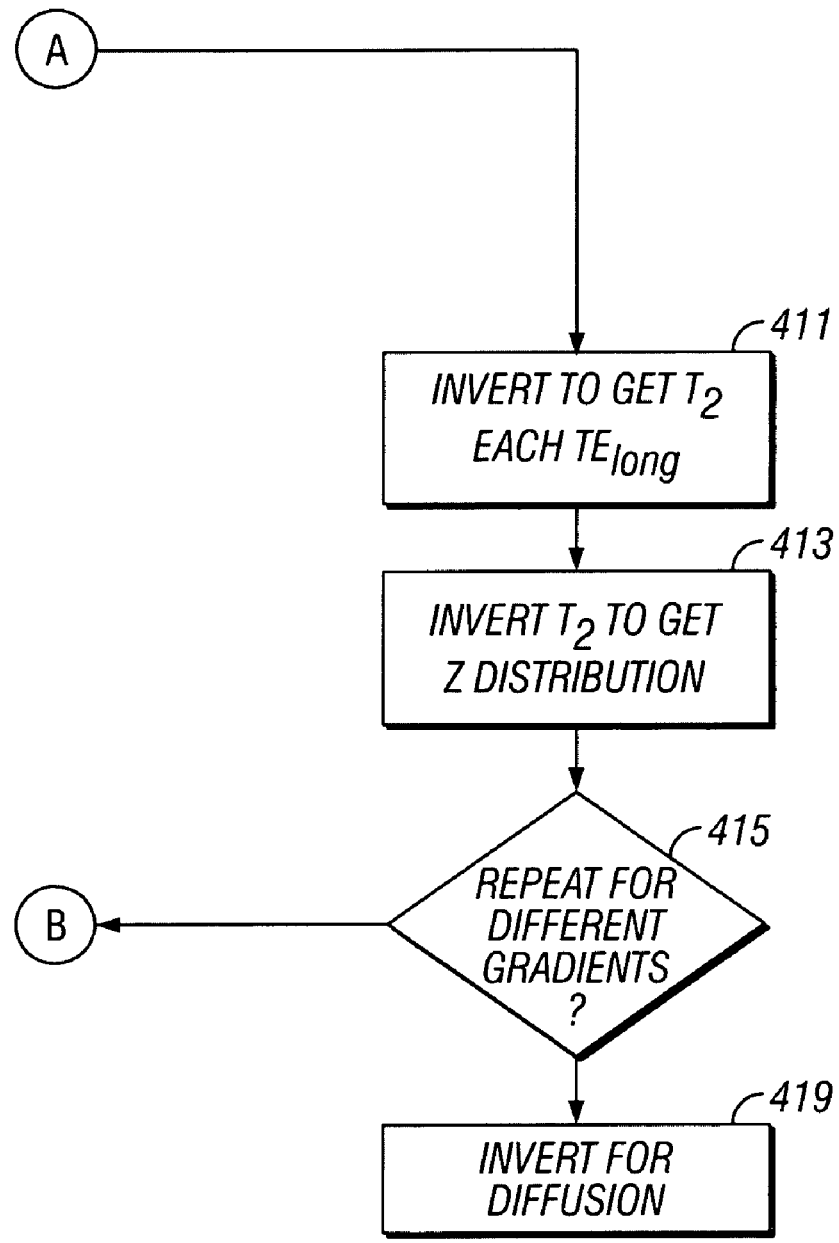

Turning now to FIGS. 5a and 5b, an exemplary flow chart illustrating the method of the present invention is shown. The nuclear spins in a region of investigation of the earth formation are polarized 401. Spin echo signals are then produced using a pulsed RF signal 403. In one embodiment of the invention, the spin echo signals are produced using the modified CPMG pulse sequence denoted by eqn. (20), i.e., with a B pulse flip angle of less than 180°. If a reduced flip angle B pulse is used, then amplitude corrections are applied 405 as discussed above and shown in Reiderman '153 and in the Rederman '493 application. In another embodiment of the invention, the B pulse flip angle is taken as 180°. In this case, 405 can be skipped. In either case, the value of TE is chosen to be as short as possible to minimize the effect of diffusion on the relaxation process. Values of TE within the range of 0.5 ms–2.0 ms are preferred. In yet another embodiment of the invention, the pulse sequence of eqn. (21) or (21a) is used, i.e., wherein a modified CPMG sequence follows an inversion recovery sequence or a driven equilibrium sequence.

The process described above is repeated for a plurality of different values of $TE_{long}$ 407, defining a plurality of diffusion editing sequences and corresponding signals. At 409, data are acquired with where $TE_{long}=TE$. This gives a reference signal for the diffusion editing process. At 411 and 413 the signals are inverted to get a $T_2$ distribution and the, the Z parameters, and the product $P_i^{(j)}=G^2_e D_i^{(j)}$. This is done solving eqns. (14)–(15). As noted above, these calculations may be done using an overdetermined system of equations.

The process is repeated at least once starting at 401 for a different field gradient, thus defining a plurality of equations of the form shown in eqn. (16). If only one additional field gradient is used, then solution is given by eqns. (17)–(18). If additional field gradients are used, then solution is obtained by solving eqn. (19).

Using the computed values of the $T_2$ distribution and the diffusion distribution, several parameters of interest of earth formations may be determined. These include but not limited to total porosity, clay bound water, bound volume irreducible, gas and oil saturation.

The method of the present invention is described above with reference to a wireline-conveyed NMR logging tool. The method may also be used on logging tools conveyed on coiled tubing in near horizontal boreholes. The method may also be used on NMR sensors conveyed on a drilling tubular, such as a drillstring or coiled tubing for Measurement-While-Drilling (MWD) applications.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining diffusion and relaxation characteristics about a fluid in an earth formation using nuclear magnetic resonance (NMR) comprising:
   (a) applying a static magnetic field to the earth formation, said applied static magnetic field producing an internal field gradient;
   (b) applying a sequence of radio frequency (RF) pulses to said earth formation;
   (c) detecting magnetic resonance signals resulting from said sequence, substantially all of said magnetic resonance signals being affected by the internal field gradient; and
   (d) processing said detected signals for determining said diffusion and relaxation characteristics, said determination taking into account said internal field gradient.

2. The method of claim 1 wherein said sequence of RF pulses further comprises:
   (A) a first sequence of RF pulses associated with a first signal at a first field gradient, and
   (B) a second sequence of RF pulses associated with a second signal at a second field gradient different from said first field gradient;
   wherein said detected signals comprise said first signal and said second signal.

3. The method of claim 2 wherein said first and second field gradients correspond to different regions of examination in said earth formation.

4. The method of claim 2 wherein said first and second pulse sequences each comprise at least one initial pulse, a first portion that follows the at least one initial magnetic field pulse, and a second portion that follows the first portion such that the second portion refocuses a last echo of the first portion.

5. The method of claim 2 wherein
   (i) said first portion comprises a modified CPMG sequence including a plurality of refocusing pulses with a tipping angle less than 180° and having a first time interval between adjacent refocusing pulses of said first portion, and
   (ii) said second portion comprises a plurality of refocusing pulses having a second time interval between adjacent refocusing pulses.

6. The method of claim 2 wherein said first portion comprises one of (i) an inversion recovery sequence, (ii) a driven equilibrium sequence, and, (iii) a CPMG sequence.

7. The method of claim 5 further comprising applying an echo train correction to said first and second signal.

8. The method of claim 5 further comprising at least one additional repetition of (A) and (B) for a different value of said first time interval.

9. The method of claim 5 further comprising repeating (i) for at least one additional value of a time interval between refocusing pulses of said CPMG sequence, said additional value being substantially equal to said second time interval.

10. The method of claim 1 further determining at least one of (i) a total porosity, (ii) clay bound water, (iii) bound volume irreducible, (iv) gas saturation, and (v) oil saturation.

11. The method of claim 2 wherein said first sequence is of a form:

$$W-90_{\pm x}-TE_{long}/2-\beta_{Y1}-TE_{long}/2-\text{echo}_1-TE_{long}/2-\beta_{y,1}-TE_{long}/2-\text{echo}_2-(TE/2-\beta_{Y2}-TE/2-\text{echo})_j$$

where j is an echo number in a train, W is a wait time, $TE_{long}$ is a diffusion editing spacing, TE is the Carr-Purcell spacing, $90_{\pm x}$ and $\beta_{Y1}$ (or $\beta_{Y2}$) are RF pulses providing rotation angles of 90 and the $\beta_{Y1}$ (or $\beta_{Y2}$) degrees of a magnetization vector.

12. The method of claim 2 wherein processing said detected signals further comprises, for said first field gradient and said second gradient, inverting said first and said second signals, to obtain an equivalent amplitude spectrum of a $T_2$ distribution.

13. The method of claim 12 wherein said processing said detected signals further comprises inverting a $T_2$ distribution to obtain a generalized parameter.

14. The method of claim 13 wherein said generalized parameter $Z_i^{(j)}$ has a form:

$$Z_i^{(j)} = \frac{C}{\gamma^2 G_e^2 D_i^j}$$

where C is a constant, $\gamma$ is a gyromagnetic ratio, $G_e$ is the effective field gradient, and $D_i^j$ is a diffusion coefficient.

15. The method of claim 13 wherein said processing said detected signals further comprises inverting a plurality of said generalized parameters.

16. The method of claim 12 wherein at least one component of said equivalent amplitude spectrum further comprises a plurality of diffusion components.

17. The method of claim 11 further comprising at least one additional repetition of (b) and (c) for a different value of $TE_{long}$.

18. The method of claim 2 wherein said first pulse sequence is of a form:

$$180-\tau_1-90_{\pm x}-[TE/2-\beta_Y-TE/2-\text{echo}]_j$$

wherein 180 is a 180° tipping pulse, $\tau$ is a wait time, TE is the Carr-Purcell spacing, $90_{\pm x}$ and $\beta_Y$ are RF pulses providing rotation angles of 90° and $\beta$ of a magnetization vector.

19. The method of claim 18 further comprising at least one additional repetition of (A) and (B) for a different value of $\tau$.

20. An apparatus for determining diffusion and relaxation characteristics about a fluid in an earth formation comprising:
   (a) a magnet on a nuclear magnetic resonance (NMR) sensor conveyed in a borehole in said earth formation, said magnet producing a static magnetic field in the earth formation with an internal field gradient therein;
   (b) a transmitter on said NMR sensor which applies a sequence of radio frequency (RF) pulses to said earth formation;
   (c) a receiver on said NMR sensor which detects magnetic resonance signals resulting from said first sequence, substantially all of the magnetic resonance signals being affected by the internal field gradient; and
   (d) a processor which determines from said detected signals said diffusion and relaxation characteristics, said determination taking into account said internal field gradient.

21. The apparatus of claim 20 wherein said transmitter applies:
   (A) a first sequence of RF pulses associated with a first signal at a first field gradient, and
   (B) a second sequence of RF pulses associated with a second signal at a second field gradient different from said first field gradient;
   wherein said magnetic resonance signals comprise said first signal and said second signal.

22. The apparatus of claim 21 wherein said first and second field gradients correspond to different regions of examination in said earth formation.

23. The apparatus of claim 21 wherein said first sequence of RF pulses and the second sequence of RF pulses each comprise at least one initial pulse, a first portion that follows the at least one initial magnetic field pulse, and a second portion that follows the first portion such that the second portion refocuses a last echo of the first portion.

24. The apparatus of claim 23 wherein
   (i) said first portion comprises a modified CPMG sequence including a plurality of refocusing pulses with a tipping angle less than 180° and having a first time interval between adjacent refocusing pulses of said first portion, and
   (ii) said second portion comprises a plurality of refocusing pulses having a second time interval between adjacent refocusing pulses.

25. The apparatus of claim 23 wherein said first portion comprises one of (i) an inversion recovery sequence, (ii) a driven equilibrium sequence, and (iii) a CPMG sequence.

26. The apparatus of claim 24 wherein said processor further applies further an echo train correction to said first and second signal.

27. The apparatus of claim 24 wherein said transmitter further performs at least one additional repetition of (A) and (B) for a different value of said first time interval.

28. The apparatus of claim 24 wherein said processor further repeats (i) for at least one additional value of a time interval between refocusing pulses of said CPMG sequence, said additional value being substantially equal to said second time interval.

29. The apparatus of claim 20 wherein said processor further determines at least one of (i) a total porosity, (ii) clay bound water, (iii) bound volume irreducible, (iv) gas saturation, and, (v) oil saturation.

30. The apparatus of claim 21 wherein said first sequence is of a form:

$$W-90_{\pm x}-TE_{long}/2-\beta_Y-TE_{long}/2-\text{echo}_1-TE_{long}/2-\beta_Y-TE_{long}/2-\text{echo}_2-(TE/2-\beta_YTE/2-\text{echo})_j$$

where j is an echo number in a train, W is a wait time, $TE_{long}$ is a diffusion editing spacing, TE is the Carr-Purcell spacing, $90_{\pm x}$ and $\beta_Y$ are RF pulses providing rotation angles of 90° and the β of a magnetization vector.

31. The apparatus of claim 20 wherein said processor further obtains an equivalent amplitude spectrum of a $T_2$ distribution.

32. A system for use in a borehole in an earth formation comprising:
   (a) a conveyance device which conveys a nuclear magnetic resonance (NMR) sensor into said borehole;
   (b) a magnet on said NMR sensor, said magnet applying a static magnetic field in said earth, said static magnetic field having an internal gradient;
   (b) a transmitter on said NMR sensor which applies radio-frequency (RF) magnetic field pulses to said formation and produces signals resulting from a $T_2$ distribution spectrum of said earth formation, at least one component of said $T_2$ spectrum further comprising a plurality of diffusion coefficients, said signals being substantially affected by the internal field gradient;
   (c) a receiver on said NMR sensor which receives said produced signals;
   (d) a processor which processes said received signals and determines therefrom said $T_2$ distribution and said plurality of diffusion coefficients, said determination accounting for said internal gradient.

33. The system of claim 32 wherein said conveyance device is one of (i) a wireline, (ii) a drillstring, and, (iii) coiled tubing.

34. A method of analyzing an earth formation comprising:
   (a) applying a static magnetic field to the earth formation, said applied static magnetic field producing an internal field gradient in said earth formation;
   (b) applying a first sequence of radio frequency (RF) pulses to said earth formation and obtaining a first signal associated with a first value of a field gradient;
   (c) applying a second sequence of radio frequency (RF) pulses to said earth formation and obtaining a second signal associated with a second value of a field gradient; and
   (d) processing said first and second signals for determining at least one of (A) a diffusion characteristic of said earth formation, and, (ii) a relaxation characteristic of said earth formation, said determination taking into account said internal field gradient;
   wherein said first and second signals being substantially affected by the internal field gradient.

35. The method of claim 34 wherein said first and second field gradients correspond to different regions of examination in said earth formation.

36. The method of claim 34 said first and second pulse sequences each comprise at least one initial pulse, a first portion that follows the at least one initial magnetic field pulse, and a second portion tat follows the first portion such that the second portion refocuses a last echo of the first portion.

37. An apparatus for use in a borehole in an earth formation comprising:
   (a) a magnet which applies a static magnetic field to the earth formation, said applied static magnetic field producing an internal field gradient in said earth formation;

(b) a transmitter which applies a first pulse sequence and a second sequence of radio frequency (RF) pulses to said earth formation;

(c) a receiver which obtains a first signal and a second signal resulting from said first and second sequence of RF pulses, said first and second signals associated with a first and second value of a field gradient in said earth formation and affected by the internal field gradient; and (d) a processor for determining from said first and second signal at least one of (A) a diffusion characteristic of said earth formation, and, (ii) a relaxation characteristic of said earth formation, said determination taking into account said internal field gradient.

38. The apparatus of claim 37 wherein said first and second field gradients correspond to different regions of examination in said earth formation.

39. The apparatus of claim 37 said first and second pulse sequences each comprise at least one initial pulse, a first portion that follows the at least one initial magnetic field pulse, and a second portion that follows the first portion such that the second portion refocuses a last echo of the first portion.

40. The apparatus of claim 37 further comprising a conveyance device selected from (i) a wireline, (ii) a drilling tubular, and, (iii) coiled tubing.

41. The method of claim 39 wherein said first portion comprises one of (i) an inversion recovery sequence, (ii) a driven equilibrium sequence, (iii) a CPMG sequence, and, (iv) a modified CPMG sequence having a refocusing pulse with a tipping angle less than 180°.

* * * * *